US011940759B2

(12) United States Patent
Cole

(10) Patent No.: US 11,940,759 B2
(45) Date of Patent: Mar. 26, 2024

(54) HOLOGRAPHIC PROJECTOR

(71) Applicant: ENVISICS LTD, Milton Keynes (GB)

(72) Inventor: Alexander Cole, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 339 days.

(21) Appl. No.: 17/461,362

(22) Filed: Aug. 30, 2021

(65) Prior Publication Data

US 2022/0075317 A1  Mar. 10, 2022

(30) Foreign Application Priority Data

Sep. 4, 2020  (GB) ...................................... 2013914

(51) Int. Cl.
*G03H 1/22* (2006.01)

(52) U.S. Cl.
CPC ......... *G03H 1/2294* (2013.01); *G03H 1/2205* (2013.01); *G03H 1/2249* (2013.01); *G03H 2225/32* (2013.01)

(58) Field of Classification Search
CPC .. G03H 1/2294; G03H 1/2205; G03H 1/2249; G03H 1/22; G03H 1/26; G03H 1/0406; G03H 2225/32; G03H 2001/2215; G03H 2001/2247; G03H 2001/2244; G03H 2001/2252; G03H 2001/2218; G03H 2210/20; G02B 27/01; G02B 27/0172; G02B 27/26; G02B 2027/0174; H04N 5/74; H04N 9/31; H04N 9/3194; G03B 21/005

USPC ............................................................ 359/9
See application file for complete search history.

(56) References Cited

U.S. PATENT DOCUMENTS

| | | | | |
|---|---|---|---|---|
| 2004/0061838 A1* | 4/2004 | Mochizuki | ............... | H04N 5/74 353/69 |
| 2008/0192017 A1* | 8/2008 | Hildebrandt | ......... | H04N 9/3194 345/173 |
| 2020/0241473 A1* | 7/2020 | Cooney | ................ | G03H 1/2205 |

FOREIGN PATENT DOCUMENTS

| | | | | | |
|---|---|---|---|---|---|
| CN | 102316296 | A | * | 1/2012 | ............. G03B 21/00 |
| CN | 102316296 | A | | 1/2012 | |
| GB | 2498170 | A | | 7/2013 | |
| KR | 2004-0090545 | A | | 10/2004 | |
| WO | 02/06899 | A2 | | 1/2002 | |
| WO | WO-2018100394 | A1 | * | 6/2018 | ............... G02B 5/32 |

* cited by examiner

*Primary Examiner* — Stephone B Allen
*Assistant Examiner* — Jyotsna V Dabbi
(74) *Attorney, Agent, or Firm* — McDonnell Boehnen Hulbert & Berghoff LLP

(57) ABSTRACT

A projector arranged to project an image within a display area on a display plane. The image comprises a light feature. A light sensor is spatially separated from the display plane. In an aligned state, light forming the light feature of the image on the display plane is at least partially disposed around the light sensor. In the aligned state, substantially no light forming the light feature impinges on the light sensor. The aligned state defines a selected alignment between the display area and the display plane (i.e. a selected position of the display area on the display plane).

20 Claims, 10 Drawing Sheets

HOLOGRAPHIC PROJECTOR

CROSS-REFERENCE TO RELATED APPLICATIONS

The present application is a non-provisional patent application claiming priority to United Kingdom Patent Application No. 2013914.3, filed Sep. 4, 2020, the contents of which are hereby incorporated by reference.

FIELD OF THE DISCLOSURE

The present disclosure relates to a projector. More specifically, the present disclosure relates to a holographic projector, a method of holographic projection and holographic projection system. Some embodiments relate to detection and adjustment of the position of a projected image on a display plane. Some embodiments relate to a head-up display and a head-mounted display.

BACKGROUND

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example.

A moving diffuser may be used to improve image quality in devices which use coherent light such as holographic projectors.

SUMMARY

Aspects of the present disclosure are defined in the appended independent claims.

A projector is arranged to project an image within a display area on a display plane. The image comprises a light feature. A light sensor is spatially separated from the display plane. In an aligned state, light forming the light feature of the image on the display plane is at least partially disposed around the light sensor. In embodiments, substantially no light forming the light feature impinges on the light sensor in the aligned state. The aligned state defines a selected alignment between the display area and the display plane (i.e. a selected position of the display area on the display plane).

Accordingly, the light feature of the image may be used in conjunction with the light sensor to detect misalignment (i.e. incorrect positioning) of the display area on the display plane. In particular, in the aligned state, light forming the light feature propagates around, and thus past, the light sensor to the display plane and the light sensor will not detect light. However, if the display area is misaligned or displaced from the selected alignment, instead of propagating around the light sensor, light forming the light feature may reach (i.e. impinge or fall on) the light sensor and the light sensor will detect light. In this way, the light sensor and light feature are arranged to detect displacement of the display area from the selected alignment, corresponding to a desired position of the image on the display plane.

The image comprising the light feature projected by the projector is substantially focused on the display plane. The display plane may be defined as an x-y plane. The spatial separation of the light sensor from the display plane may be defined in the z direction. The light sensor may be positioned on a sensor plane that is parallel to the display plane. Thus, the display plane and the sensor plane may be defined by the same x-y coordinate system (i.e. with the same origin). The light sensor may be positioned upstream of the display plane. It may be said that the sensor plane is upstream of the display plane relative to the projected light. Thus, the image comprising the light feature is unfocussed at the sensor plane. The light sensor is arranged at a position (e.g. x-y position) on the sensor plane, corresponding to a position (e.g. the same x-y position) on the display plane, at which the light feature is dark and is at least partially surrounded by light, in the aligned state. It may be said that a first reference point comprising a predetermined dark point of the light feature, such as a central point of the light feature, is aligned with a second reference point of the light sensor, such as a central point of the light sensor. The selected alignment may be defined in the x and y directions. The selected alignment may be defined by a distance between the respective x-y positions of the first and second reference points in the x and y directions. For example, the distance may be zero in the x and y directions in the aligned state, such that the first and second reference points are coincident (i.e. have the same (x, y) coordinates.

In some implementations, the light feature comprises a dark region at least partially surrounded by a light region. In particular, the dark region does not receive light (i.e. has negligible light intensity) and the light region does receive light (i.e. has substantial light intensity). Such a light feature may be called a "hollow light feature". For example, the hollow light feature may comprise a plurality of "image pixels" (as defined herein) arranged around the perimeter of a two-dimensional shape, such as a circle or polygon, or a part thereof, such as an arc or intersecting edges. Internal points of the two-dimensional shape are dark (i.e. do not receive light).

In some implementations, the projector further comprises an alignment controller. The alignment controller is arranged to change the position of the display area on the display plane if the light sensor detects light of the light feature. In particular, the alignment controller may be arranged to change the position of the display area on the display plane by translating the display area on the display plane. For example, the translation may be in the x direction, the y direction or both. In some implementations, the position of the display area may be translated in order to restore the aligned state. For example, the translation may be performed in one step, incrementally or otherwise until the light sensor no longer detects light of the light feature.

In some implementations, the projector comprises a spatial light modulator arranged to display a diffractive pattern comprising a hologram of the image. The projector further comprises a light source arranged to illuminate the diffractive pattern in order to form a holographic reconstruction, corresponding to the image, on the display plane. The diffractive pattern may comprise at least one phase-ramp function. Translating the display area may comprise changing the phase gradient of the at least one phase-ramp function.

In some implementations, the projector is further arranged to change the light feature if the light sensor detects light of the light feature. For example, the projector may change the hologram of the diffractive pattern to change one of a shape, size and dimension of the light feature of the image. In particular, the light feature is changed in order to determine the translation (e.g. direction and optionally distance) required to restore the aligned state.

The shape, size and/or dimensions of the light feature and the light sensor, and the separation of the light sensor from the display plane may be chosen to provide the desired sensitivity to misalignment (i.e. displacement from the selected relative alignment of the aligned state).

In some implementations, the alignment controller is arranged to continually monitor, and dynamically change as necessary, the relative alignment of the display area and light sensor (and thus the display plane) during projection of a sequence of images.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments may be disclosed separately in the detailed description which follows, any feature of any embodiment may be combined with any other feature or combination of features of any embodiment. That is, all possible combinations and permutations of features disclosed in the present disclosure are envisaged.

BRIEF DESCRIPTION OF THE FIGURES

Specific embodiments are described by way of example only with reference to the following figures.

The same reference numbers will be used throughout the drawings to refer to the same or like parts.

DETAILED DESCRIPTION

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
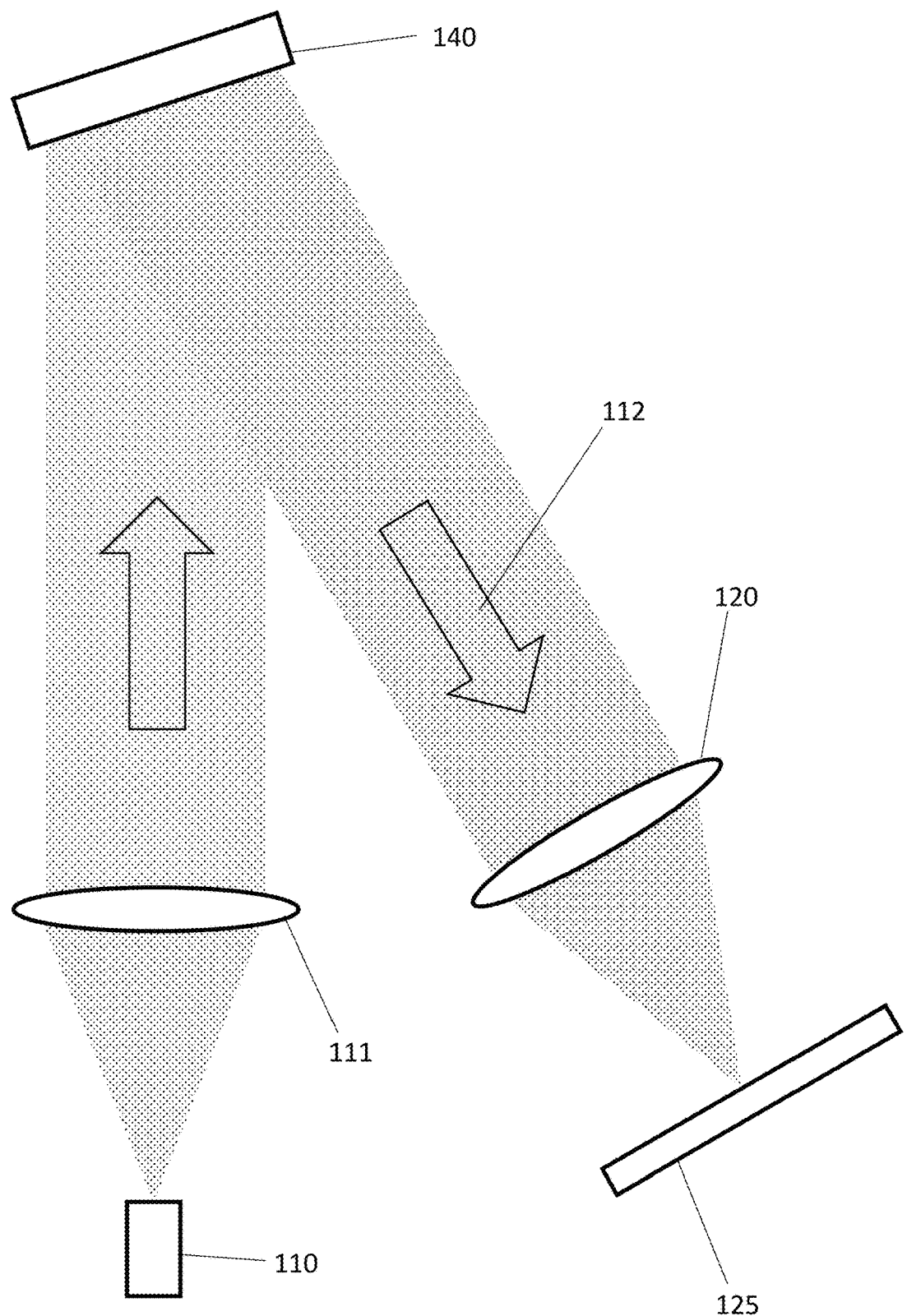
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field on a replay plane. The holographic reconstruction may be formed on a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125. In accordance with embodiments, the optical configuration of FIG. 1 is used in a holographic projector to display an image (i.e., holographic reconstruction) within a display area on a display plane (e.g. screen or diffuser 125).

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Further-more, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\Psi_A(x, y)$ and $\Psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in United Kingdom Pat. No. 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\Psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\Psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
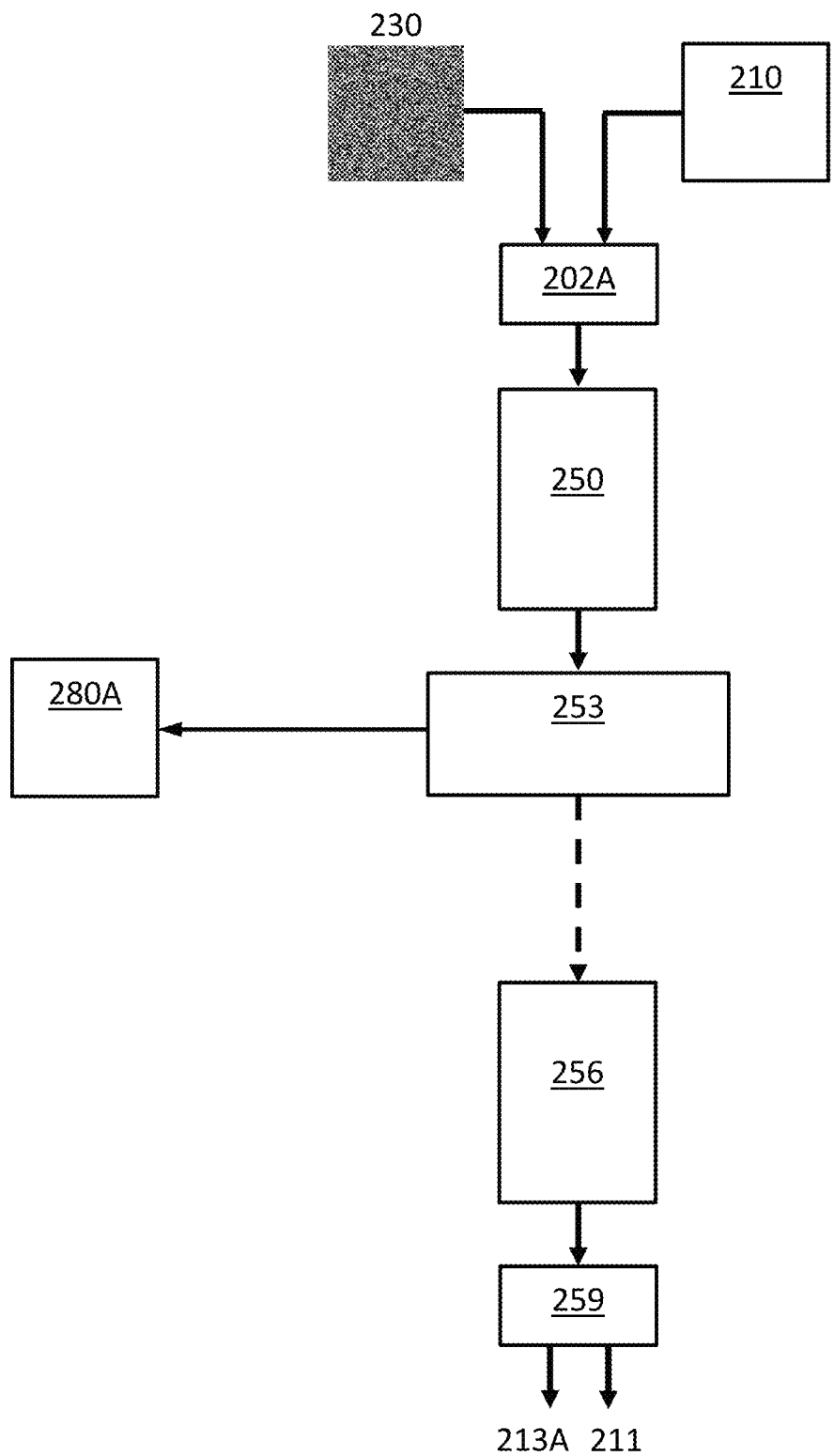
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
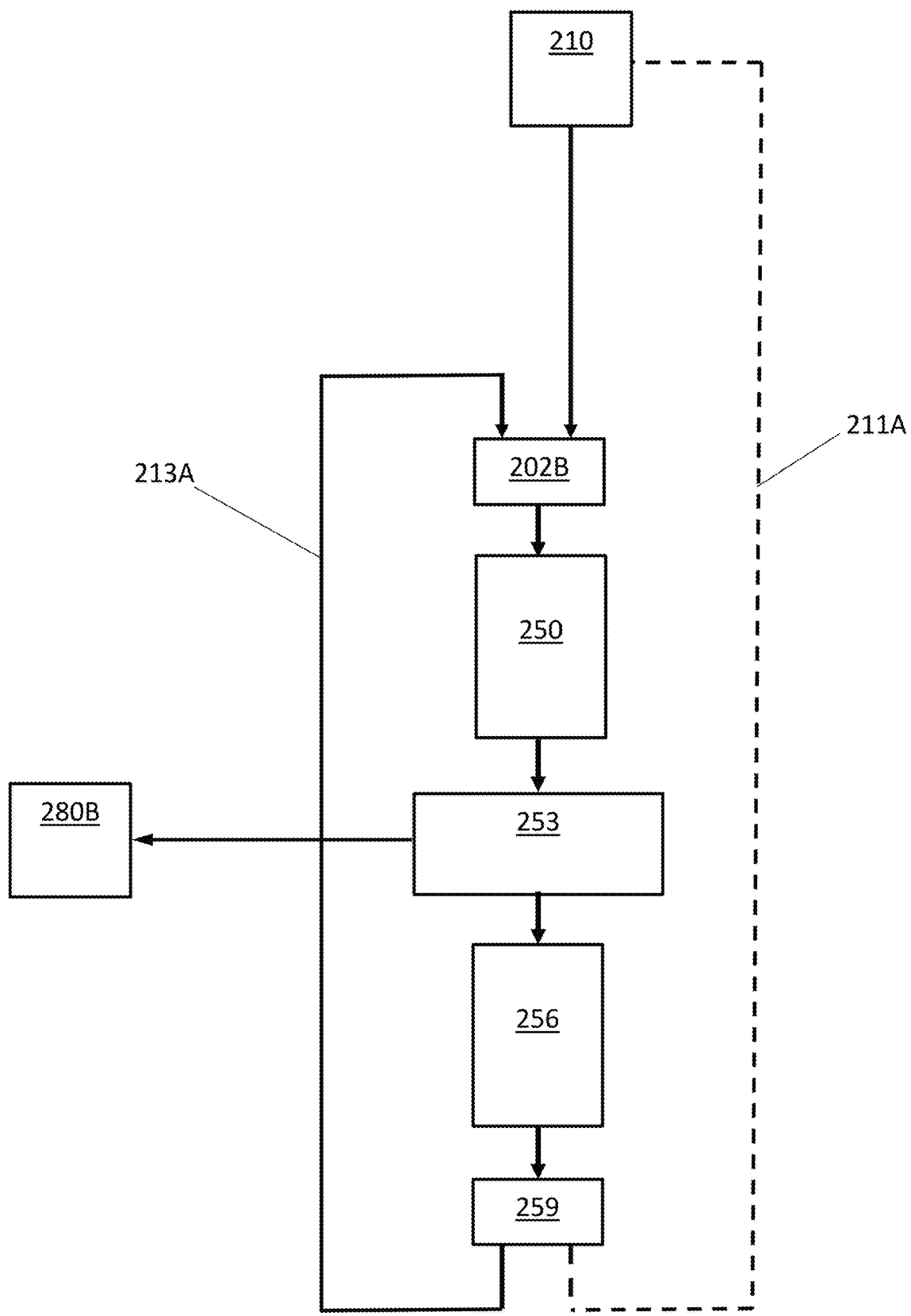
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
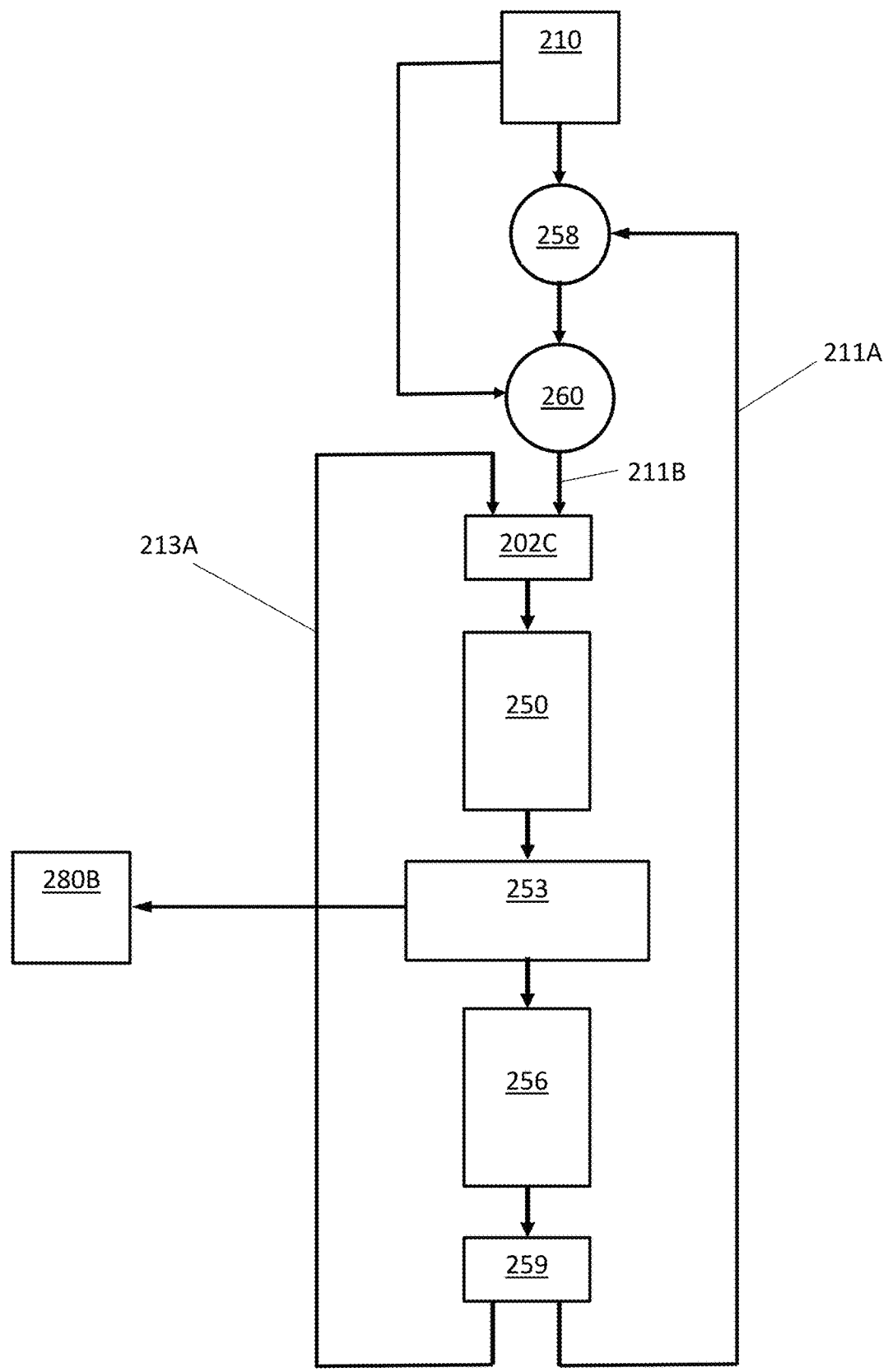
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y] = F'\{\exp(i\psi_n[u,v])\}$$

$$\psi_n[u,v] = \angle F\{\eta \cdot \exp(i\angle R_n[x,y])\}$$

$$\eta = T[x,y] - \alpha(|R_n[x,y]| - T[x,y])$$

where:
F' is the inverse Fourier transform;
F is the forward Fourier transform;
R[x, y] is the complex data set output by the third processing block 256;
T[x, y] is the input or target image;
is the phase component;
Ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram Ψ(u, v) comprises a phase distribution in the frequency or Fourier domain.

The embodiment of FIG. 2C is the same as that of FIG. 2A and FIG. 2B in all other respects. It may be said that the phase-only hologram Ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
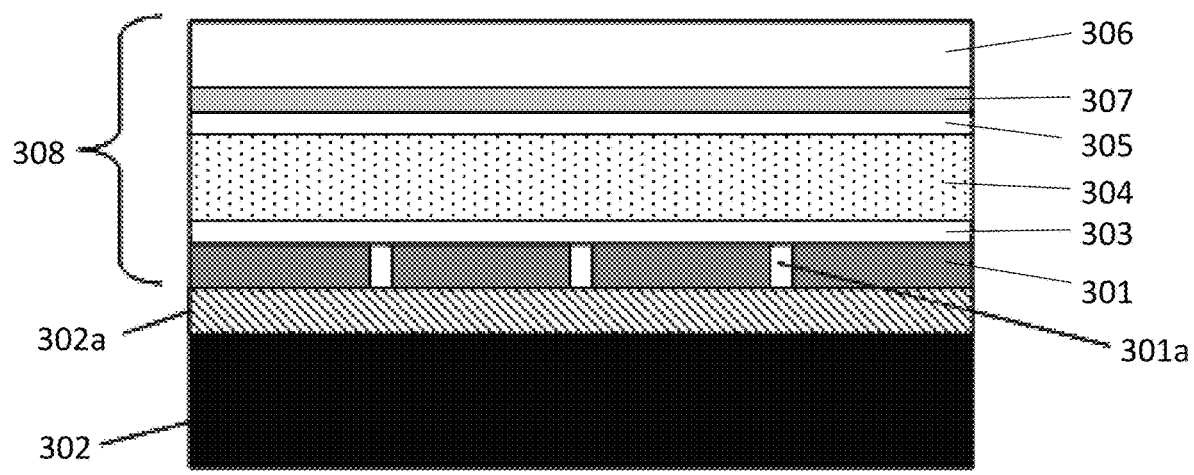
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301*a*, arranged on the upper surface of the substrate. Each of the electrodes 301 can be addressed via circuitry 302*a* buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301*a*. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Alignment Sensor

A holographic projector may project an image or sequence of images within a display area (i.e. replay field) on a display plane (i.e. replay plane). In order to provide optimal image quality for the viewer, it is important that the (or each) image is formed at the correct (i.e. desired) position on the display plane. Correct positioning or alignment of the image on the display plane ensures optimal image sharpness. In addition, in the case of the projection of full-colour images, correct positioning or alignment ensures consistent size of, and alignment between, individual single colour holographic reconstructions that combine to reproduce the full-colour image. However, incorrect positioning or alignment of the image on the display plane may occur when the display area (replay field) is incorrectly positioned on the display plane (replay plane).

A light feature may be formed as part of the image within the display area for use in detecting the alignment or positioning of the display area on the display plane. The light feature may be formed at a defined position, typically spatially separated from the image content, within the display area. A light sensor may be mounted at a fixed position within the projector so as to detect light of the light feature when the display area is correctly positioned (i.e. aligned) on the display plane. However, since the light sensor cannot be physically coincident with the display plane, which typically comprises a screen or diffuser, the light sensor must be placed in front of the display plane. In consequence, the light feature is not formed "in focus" on the light sensor. Thus, it may be difficult to identify differences in the light detected by the light sensor between scenarios where there is alignment and misalignment. In consequence, such an alignment technique may not provide the necessary degree of precision (sensitivity) and/or accuracy. The present disclosure proposes an alternative alignment technique for improved precision and/or accuracy.

Figure 4:
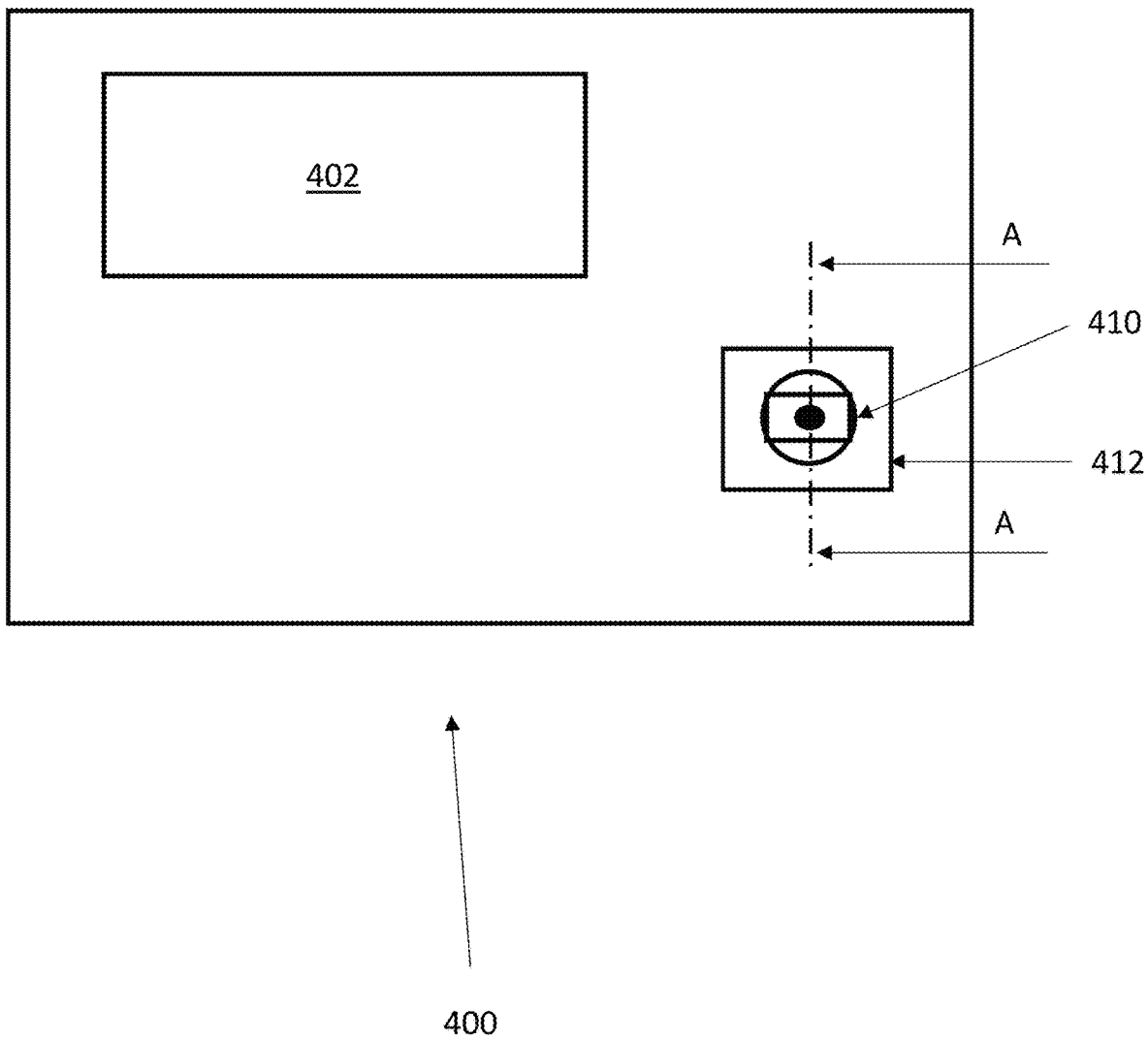
FIG. 4 shows an image formed within a display area on a display plane in accordance with embodiments.
Figure 5:
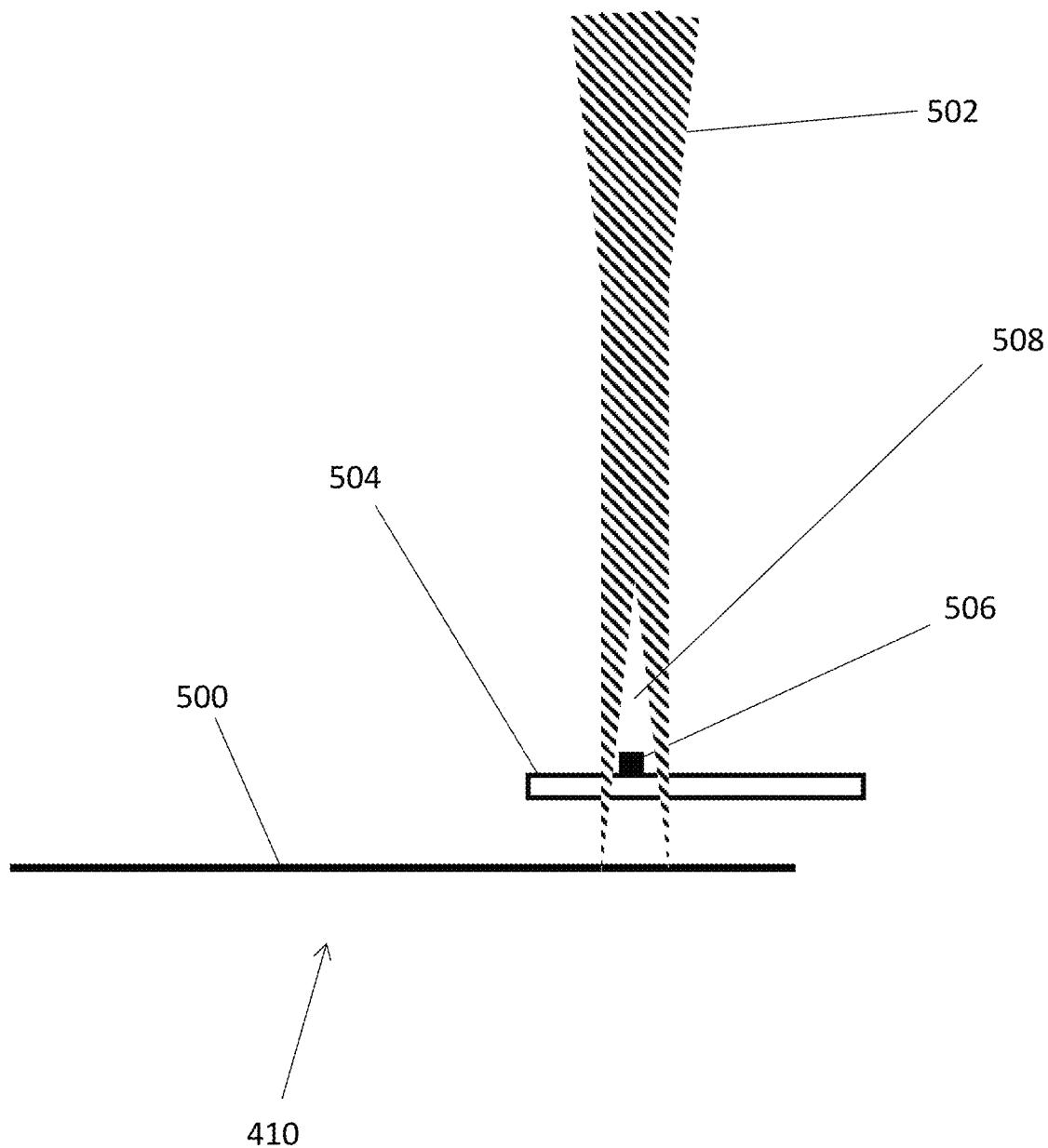
FIG. 5 is a schematic cross section along the line A-A of FIG. 4 in an aligned state.
Figure 6:
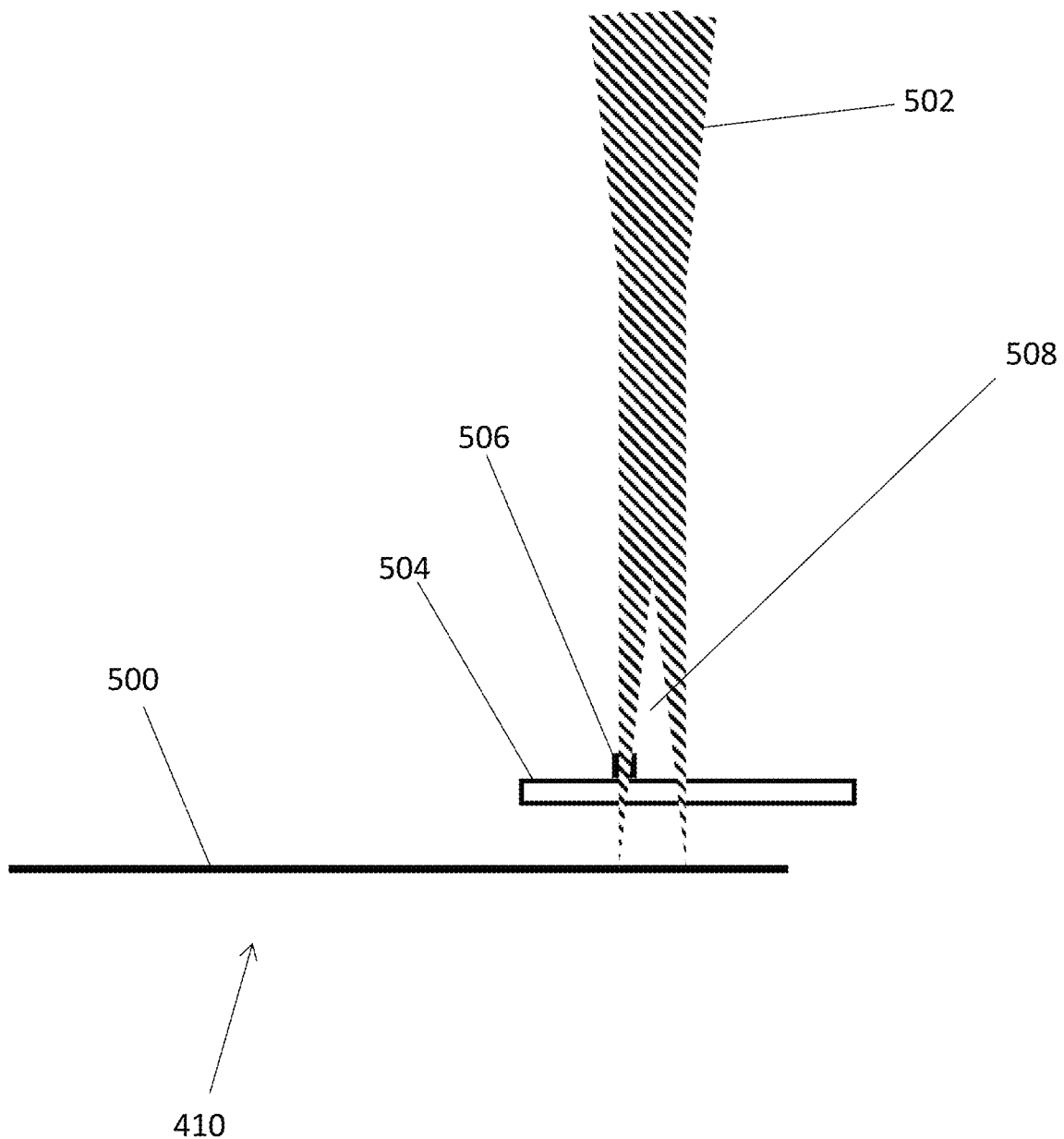
FIG. 6 is a schematic cross section equivalent to FIG. 5 in a misaligned state.

FIGS. 4, 5 and 6 show an example arrangement in accordance with embodiments of the present disclosure. In particular, FIG. 4 shows a display area 400 comprising an image content area 402 and a light feature area 412 formed on a display plane 500. In a holographic projection system, display area 400 is a replay field (e.g. a far field replay field) comprising a holographic reconstruction formed by illuminating a spatial light modulator displaying a diffractive pattern comprising a hologram corresponding to the image content and light feature, as described herein. In some implementations, such as in a head-up display, the display plane 500 comprises a screen or diffuser positioned at the replay plane, and the image (holographic reconstruction) formed in image content area 402 is projected and optionally magnified (e.g. by a projection lens) for viewing by a viewer, as well known in the art.

As shown in FIG. 4, light feature area 412 is spatially separated from image content area 402 and occupies a smaller proportion of the display area 400 than the image content area 402. Typically, image content area 402 occupies a central region of the display area/replay field and light feature area 412 occupies a peripheral region of the display area/replay field. In this way, baffles may be used to prevent projection of the image (holographic reconstruction) formed in the light feature area 412 of the display area 400 for viewing by a viewer. As the skilled person will appreciate, the relative sizes of the image content area 402 and light feature area 412 shown in FIG. 4 are for the purposes of illustration only and are not to scale.

In the example illustrated in FIG. 4, the light feature 410 formed in light feature area 412 comprises a ring of light. In particular, the light feature 410 is formed by a plurality of light spots (i.e. image pixels) arranged in circular configuration. It may be said that the image pixels are arranged around the perimeter or circumference of a circle. A central dark region of the light feature 410, where there is no light, is formed inside the closed area defined by the image pixels (i.e. inside the circle). Thus, the light feature may be described as a "hollow circle" or an "empty circle" of light. The central point of the light feature 410, corresponding to the centre of the circle or ring of light, is thus a dark point that may be used as a first reference point for alignment, as described below. This is possible because the light feature 410 is formed such that its central point (or other reference point) is at a fixed position within the display area (replay field) 400. In the illustrated arrangement the central point of the light feature 410 is at the centre of light feature area 412.

FIG. 5 shows light rays 502 received from a spatial light modulator (not shown) forming the light feature 410 comprising the hollow circle of FIG. 4. The hollow circle is focused on the display plane 500. Thus, the light rays 502 define a conical void 508, which does not receive light. It may be said that the light rays 502 propagate around conical void 508. In particular, conical void 508 has the shape of a right circular cone, wherein the axis of the cone extends perpendicularly to the display plane 500 and is colinear with the projection axis (or propagation path) of the light rays 502. A light sensor 506 is mounted in front of the display plane 500. In particular, the light sensor 506 is mounted on a sensor plane, such as an optically transparent circuit board 504, arranged parallel to, and upstream of, the display plane 500. A central point of the light detecting area of the light sensor 506 may be used as a second reference point for alignment, as described below. This is possible because the light sensor 506 is mounted at a fixed position relative to the display plane 500.

In FIG. 5, the light sensor 506 is coincident with the projection axis of the light rays 502, and thus the centrally-located axis of the conical void 508. FIG. 5 illustrates the light rays 502 when the light feature is positioned in an "aligned state", such that the display area (including the image content and light feature) is correctly positioned or aligned on the display plane 500. In particular, the first reference point—the central dark point of the light feature corresponding to the centre of the circle at the intersection of the projection axis—is aligned with the second reference point at the centre of the light sensor 506. In particular, the first and second reference points are coincident (have no separation) in the x and y directions on the sensor plane. It may be said that a relative alignment of the aligned state is such that the x-y coordinates of the first and second reference points are the same. Thus, all of the light rays 502 surrounding the centre of the circle propagate past light sensor 506, without substantially impinging on the light detecting surface thereof. Accordingly, light sensor 506 does not detect light of the light feature indicating correct positioning or alignment of the display area on the display plane 500.

FIG. 6 illustrates the light rays 502 when the light feature is positioned in a "misaligned state", such that the display area (including the image content and light feature) is incorrectly positioned (or misaligned) on the display plane 500. In particular, the first reference point—the central dark point of the light feature corresponding to the centre of the circle at the intersection of the projection axis—is not aligned with the second reference point at the centre of the light sensor 506. Instead, the first reference point is spatially separated from the second reference point in the x and y directions on the sensor plane. Thus, some of the light rays 502 surrounding the centre of the circle fall on the light detecting surface of light sensor 506. Accordingly, light sensor 506 detects light of the light feature indicating a misalignment of the display area on the display plane. In the illustrated arrangement, light sensor 506 is optically transparent, such that the light feature is still formed on the display plane in the misaligned state. However, this is not essential. In other embodiments, light sensor 506 and sensor plane 504 may be opaque.

The misalignment shown in FIG. 6 arises due to a translation of the display area (replay field) 400 on the display plane (replay plane) 500. The display plane 500 may be defined as an x-y plane. In the illustrated configuration, the propagation axis of the light rays 502 extends orthogonally to display plane 500 in the z direction, although this is not essential. Since the sensor plane 504 is arranged parallel to the display plane 500, the spatial separation of the light sensor 506 from the display plane 500 is in the z direction. The second reference point of the light sensor 506 is arranged at a fixed x-y coordinate position on the sensor plane corresponding to the same x-y coordinate position on the display plane. Thus, in the aligned state shown in FIG. 5, the central dark point of the light feature forming the second reference point has the same x-y coordinate position as the first reference point. However, in the misaligned state shown in FIG. 6, the central dark point of the light feature forming the second reference point has an x-y coordinate position that is translated (e.g., moved in the x direction, the y direction or both) relative to the x-y coordinate position of the first reference point. In accordance with embodiments of the present disclosure, this misalignment can be corrected by an opposite translation of the display area relative to the display plane so that the x-y coordinates of the first and second reference points are the same.

Alignment Correction Method

Figure 7:
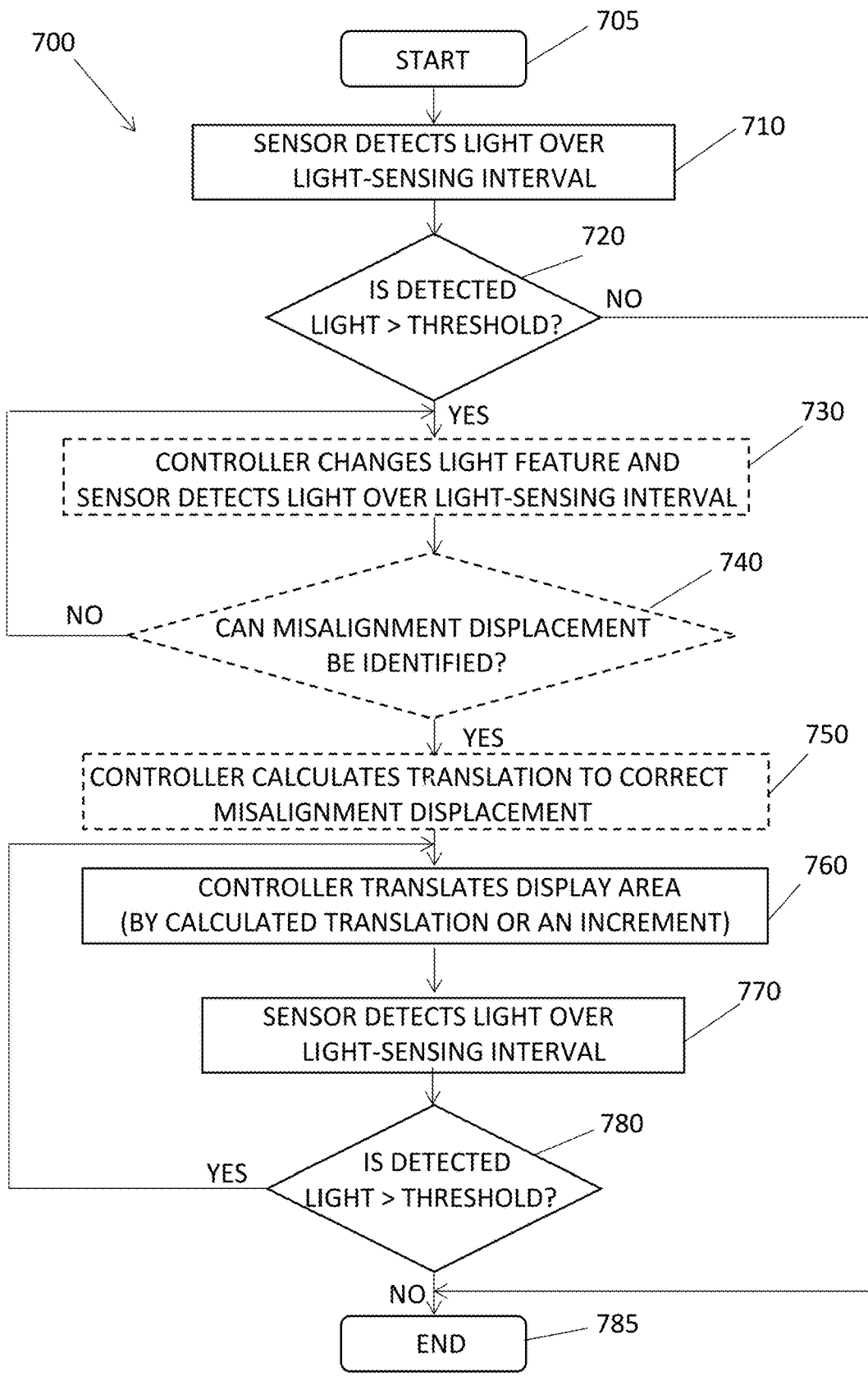
FIG. 7 is a flow diagram of a method in accordance with embodiments.

FIG. 7 is a flow diagram of an example method 700 of operating an alignment system of a projector, as described above. In particular, the method 700 detects and corrects misalignments of the display area on the display plane. The method 700 may be performed by a projector controller in conjunction with an alignment sensor comprising a light sensor, as described above. The method 700 may be performed continuously, periodically, in response to a trigger event or otherwise according to application requirements.

The method starts at step 705. In step 710, the sensor detects light for a predetermined light-sensing interval, and in step 720 the method determines whether the sensor detected light of the light feature. For example, light of the light feature may be detected if the light detecting element(s) of the sensor detects light of the relevant wavelength above a threshold level in step 710. Typically, the threshold is set at zero. If step 720 determines that no light of the light feature was detected, the alignment of the display area, and thus the projected image, on the display plane is correct and the method ends at step 785. However, if step 720 determines that light of the light feature is detected, then misalignment is detected. Thus, a misalignment signal may be sent to initiate a procedure to correct for the misalignment. The method may then proceed to optional step 730 or to step 760.

At optional step 730, the light feature of the projected image is changed and the sensor detects light for the light-sensing interval. For example, the projector controller may change the diffractive pattern displayed on the spatial light modulator to change one or more of: a shape; dimension, or overall size of the light feature formed in the light feature area of the display area. In particular, the light feature may be changed in order to determine at least the direction of the misalignment on the display plane and optionally the distance. For example, in a scenario in which the original light feature is a circle, as in FIG. 4, the light feature may be changed to an arc of light (e.g. an arc subtending 5 to 10 degrees) having the same radius of curvature and centre as the original light feature. In this scenario, light of the arc will continue to be detected by the light sensor when the misalignment is in a direction along a radius of the arc. Notably, the new light feature has the same reference point as the original light feature, which may correspond to a fixed point within a light feature area of the display area. In examples in which the light detector comprises a plurality of light detecting elements, it may be possible to determine both the direction and distance of the misalignment. As the skilled person will appreciate, in other examples, the light feature may be changed to a different shape and/or size, such as from a circle to a larger polygon.

Optional step 740 determines whether the misalignment displacement (e.g. direction and optionally distance of misalignment) can be identified. In the above scenario, it is possible to identify the misalignment displacement when the light of the new (changed) light feature detected in step 730 is substantially the same as the light of the original light feature detected in step 710. If the misalignment displacement cannot be identified, the method returns to step 730, which changes the light feature again. The method may then continue through a series of different light features until step 740 determines that the misalignment displacement can be identified. When the misalignment displacement can be identified, optional step 750 calculates the translation (i.e. direction and optionally distance) required to correct the misalignment and the method proceeds to step 760.

Step 760 translates the display area relative to the display plane to correct for the misalignment. For example, the projector controller may change the phase gradient of at least one phase-ramp function (e.g. an x direction and/or y direction phase ramp function) of the diffractive pattern displayed on the spatial light modulator of the holographic projector, so as to translate the display area (replay field) on the display plane (replay plane). If step 760 follows optional step 750, step 760 may translate the display plane according to the calculated translation (direction and optionally distance). If step 760 follows step 720, step 760 may translate the display area relative to the display plane in one of a predetermined series of incremental translations.

At step 770, the original light feature is again formed and the sensor detects light for the predetermined light-sensing interval, and step 780 determines whether the sensor detected light of the light feature in step 770. If step 780 determines that light of the light feature was detected in step 770, the misalignment of the projected image on the display plane has not been fully corrected and the method returns to step 760 which repeats the incremental translation until alignment is achieved. When step 780 determines that no light of the light feature was detected in step 770, the misalignment of the projected image on the display plane has been successfully corrected and the method ends at step 785.

System Diagram

Figure 8:
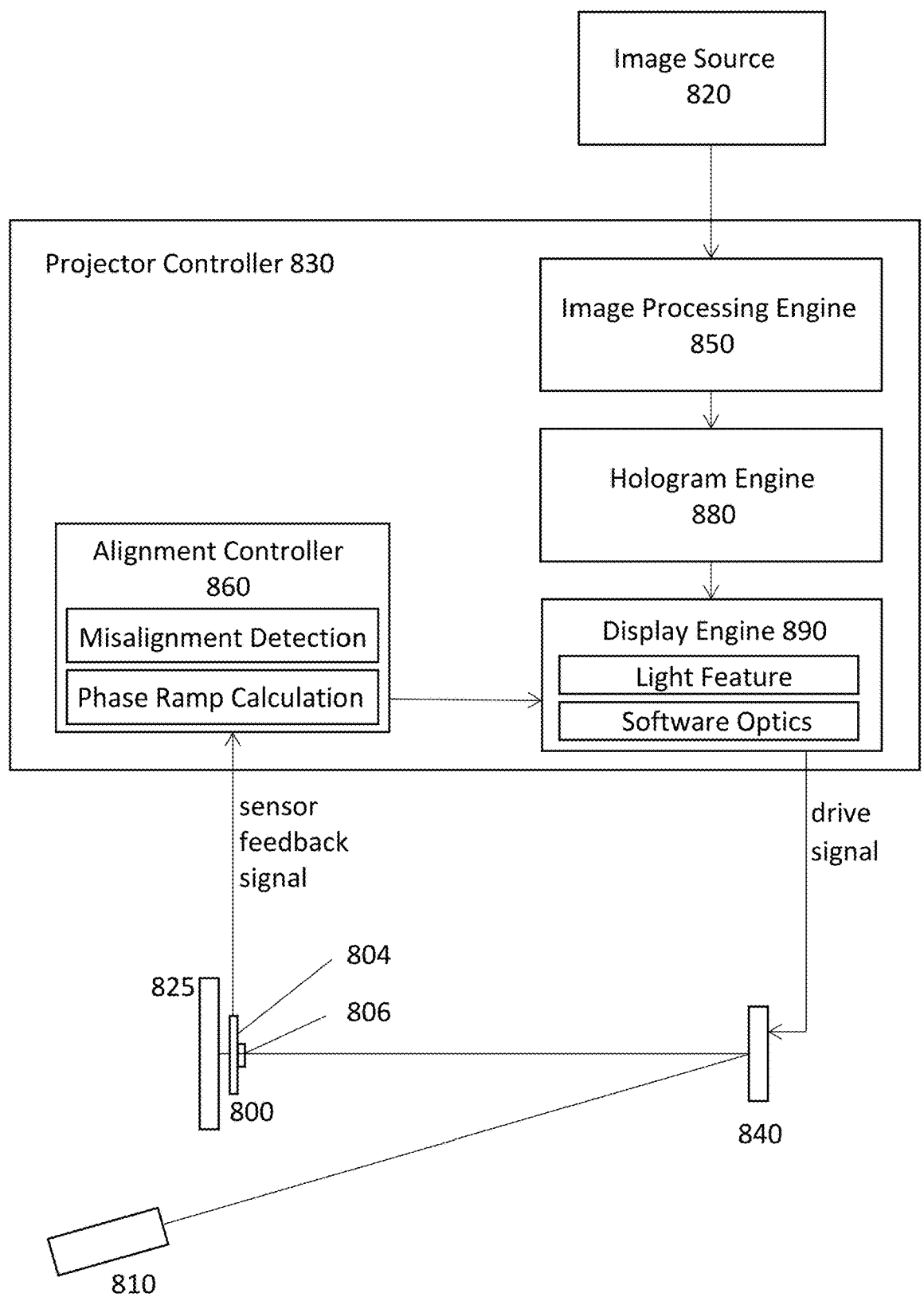
FIG. 8 is a schematic of a holographic projection system in accordance with embodiments.

FIG. 8 show a schematic of a holographic projection system in accordance with embodiments. The system comprises a holographic projector including a light source 810, spatial light modulator (SLM) 840, a screen or diffuser 825 and an alignment sensor 800. The system further comprises a projector controller 830 including an image processing engine 850, a hologram engine 880, a display engine 890 and an alignment controller 860.

SLM 840 is arranged to display a diffractive pattern comprising a hologram of an image in response to a drive signal received from display engine 890. In operation, light source 810 is arranged to illuminate the diffractive pattern displayed on SLM 80 and a holographic reconstruction is formed in a replay field on diffuser 925 at the replay plane. It should be noted that the illustrated paths of the illuminating and spatially modulated light beams of the projector are schematic for convenience of illustration. In practice, in accordance with the law of reflection, the angle of incidence of the illuminating beam from light source 810 on SLM 840 and the angle of reflection of the spatially modulated beam from SLM 840 to diffuser 825 are the same. Similarly, the position of alignment sensor 806 relative to diffuser 815 is also schematic, and the illustrated features are not to scale.

Projector controller 830 is arranged to receive one or more images from an image source 820. For example, image source 820 may be an image capture device such as a still camera arranged to capture a single still image or video camera arranged to capture a video sequence of moving images.

Projector controller 830 comprises image processing engine 850, hologram engine 880 and display engine 890. Image processing engine 850 is arranged to receive and process each source image from image source 820 and pass the processed image(s) to hologram engine 880. Hologram engine 880 is arranged to determine a hologram corresponding to each processed image. Display engine 890 is arranged to provide a drive signal to SLM 840 to display a diffractive pattern comprising each hologram. In embodiments, display engine 890 is arranged to add a light feature, as described herein, to the hologram of the image (e.g. in a light feature area spatially separated from an image content area) of the diffractive pattern. Optionally, display engine 890 is further arranged to tile the hologram in accordance with a tiling scheme to form the diffractive pattern for display on SLM 840. In addition, display engine 890 is arranged to add a phase ramp function (software grating function in x and y directions) to the diffractive pattern using software optics, in accordance with a signal received from alignment controller 860.

Alignment sensor 800 comprises a light sensor 806 mounted on an optically transparent circuit board 804. Circuit board 804 is positioned at a sensor plane arranged parallel to the diffuser 925 positioned at the replay plane, as described herein. As shown in FIG. 8, sensor plane is arranged upstream of the replay plane. The light sensor 806 has a fixed (x, y) position on the sensor plane for detecting an aligned state, in which there is a selected alignment between the replay field (display area) and the replay plane (display plane) formed by diffuser 925, as described herein. In particular, light sensor 806 does not detect light of the light feature when the projector is operated in the aligned state. However, the light sensor 806 does detect light of the light feature when the projector is operated in a misaligned state.

Alignment sensor 800 provides a sensor feedback signal to alignment controller 860. In embodiments, a feedback signal may be provided when light of the light feature is detected by light sensor 806. In other embodiments, a feedback signal may be provided continually, periodically, in response to a trigger event or otherwise. The feedback signal may indicate a light level detected by alignment detector. Alignment controller 860 may determine whether the projector is being operated in a misaligned state, and, if so, perform an alignment method to correct the misalignment, as described herein. For example, alignment controller 860 may perform a method according to embodiments as shown in FIG. 7. In particular, misalignment detection may determine when a misaligned state is detected, and optionally identify a misalignment displacement thereof. Phase ramp calculation may determine a new phase ramp function (x and y phase ramp functions) for a first iteration to correct for the misalignment, and provide a control signal to display engine 890, accordingly. Alignment controller 860 or display engine 890 may further provide a control signal to change the light feature added to the hologram of the image for a first iteration, as described herein. The display engine 890 may then generate a drive signal to cause SLM 840 to display a new diffractive pattern to form a holographic reconstruction thereof on diffuser 825 with the display area (replay field) at a translated position on the display area (replay plane/diffuser 825) in accordance with the new phase ramp function. Alignment sensor 800, in turn, provides a feedback signal to alignment controller 830, which determines whether the misalignment is corrected. In particular, the misalignment is corrected (i.e. the aligned state is restored) when the misalignment detection determines that no light of the light feature is detected by light sensor 860. The alignment controller 860 may be arranged to perform multiple iterations of the alignment method, in which each iteration incrementally changes the position of the replay field (display area) on the replay plane (display plane) formed by diffuser 825 until the aligned state is restored, as described herein.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the light sensor is a photodetector such as a photodiode (i.e. single light detecting element) or an array of light detecting elements forming a light sensing area thereof. In some embodiments, the light sensor is transparent to the light of the light feature. In some embodiments, the light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the hologram is smaller than the spatial light modulator. More specifically, the number of hologram pixels is less than the number of light-modulating pixels available on the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator. In some embodiments, the technique of "tiling" is implemented to increase image quality. Specifically, some embodiments implement the technique of tiling to minimise the size of the image pixels whilst maximising the amount of signal content going into the holographic reconstruction. In some embodiments, the holographic pattern written to the spatial light modulator comprises at least one whole tile (that is, the complete hologram) and at least one fraction of a tile (that is, a continuous subset of pixels of the hologram).

In embodiments, only the primary replay field is utilised and system comprises physical blocks, such as baffles, arranged to restrict the propagation of the higher order replay fields through the system.

In embodiments, the holographic reconstruction is colour. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose. The light feature of the alignment technique described herein may comprise non-visible light, thereby eliminating the need for baffles.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. A projector arranged to project an image within a display area on a display plane, wherein the image comprises a light feature comprising a dark region surrounded by a light region, and the projector comprises a light sensor spatially separated from the display plane, wherein the display area and the light sensor are aligned such that light forming the light feature of the image on the display plane is at least partially disposed around the light sensor, without substantially impinging thereon, when operated in an aligned state, wherein the aligned state defines a selected alignment between the display area and the display plane; and wherein, when operated in the aligned state, a reference point in the dark region of the light feature is coincident with a reference point of the light sensor.

2. The projector as claimed in claim 1 wherein the light sensor is disposed upstream of the display plane.

3. The projector as claimed in claim 1 wherein the image is substantially focused on the display plane.

4. The projector as claimed in claim 1 wherein the light feature comprises a hollow light feature or a part thereof.

5. The projector as claimed in claim 4 wherein the light feature comprises one of: a hollow circle or ring of light; a hollow polygon of light; an arc of light, and an intersection of edges of a polygon of light.

6. The projector as claimed in claim 1 further comprising an alignment controller arranged to change a position of the display area on the display plane.

7. The projector as claimed in claim 6 wherein the alignment controller is arranged to change the position of the display area on the display plane if the light sensor detects light of the light feature.

8. The projector as claimed in claim 6 wherein the alignment controller is arranged to change the position of the display area on the display plane by translating the display area.

9. The projector as claimed in claim 8 wherein the alignment controller is arranged to translate the position of the display area in order to restore the aligned state.

10. The projector as claimed in claim 6 wherein the alignment controller is arranged to continually assess, and change as necessary, the relative alignment of the display area and light sensor during projection of a sequence of images.

11. The projector as claimed in claim 1 wherein the projector comprises: a spatial light modulator arranged to display a diffractive pattern comprising a hologram of the image; and a light source arranged to illuminate the diffractive pattern in order to form a holographic reconstruction, corresponding to the image, on the display plane.

12. The projector as claimed in claim 11 wherein the diffractive pattern further comprises at least one phase-ramp function and translating the display area comprises changing a phase gradient of the at least one phase-ramp function.

13. The projector as claimed in claim 1 wherein the projector is further arranged to change a shape of the light feature if the light sensor detects light of the light feature in order to determine a translation required to restore the aligned state.

14. A method of operating a projector arranged to project an image comprising a light feature within a display area on a display plane, wherein the light feature comprises a dark region surrounded by a light region, the method comprising:
  providing a light sensor spatially separated from the display plane;
  projecting the image within the display area on the display plane, wherein light of the light feature is at least partially disposed around the light sensor, without substantially impinging thereon, when operated in an aligned state, wherein the display area is correctly positioned with a selected alignment on the display plane in the aligned state, and wherein, when operated in the aligned state, a reference point in the dark region of the light feature is coincident with a reference point of the light sensor;
  detecting, by the light sensor, light of the light feature during a light sensing interval, and
  determining a misaligned state when the detected light is greater than a threshold, wherein the display area is not correctly positioned in the display plane in the misaligned state.

15. The method as claimed in claim 14 further comprising:
  translating the display area relative to the display plane to restore the aligned state, in response to determining a misaligned state.

16. The method as claimed in claim 15 further comprising:
  changing the projected image so as to change the light feature;
  detecting, by the light sensor, light of the changed light feature during a light sensing interval, and
  determining a direction of a translation of the display area required to restore the aligned state.

17. The method as claimed in claim 15 wherein translating the display area is performed incrementally.

18. The method as claimed in claim 15, wherein the projector comprises a spatial light modulator arranged to display a diffractive pattern comprising a hologram of the image; and a light source arranged to illuminate the diffractive pattern in order to form a holographic reconstruction, corresponding to the image, on the display plane, and wherein the diffractive pattern further comprises at least one phase-ramp function and translating the display area comprises changing a phase gradient of the at least one phase-ramp function.

19. The method as claimed in claim 14, wherein the method is performed to continually assess, and change as necessary, the relative alignment of the display area and light sensor during projection of a sequence of images.

20. A projector arranged to project an image within a display area on a display plane, wherein the image comprises a light feature comprising a dark region surrounded by a light region, and the projector comprises a light sensor spatially separated from the display plane, wherein the display area and the light sensor are arranged such that, when operated in an aligned state, light forming the light feature of the image on the display plane is at least partially disposed around, without impinging on, a reference point of the light sensor, wherein the aligned state defines a selected alignment between the reference point of the light sensor and a reference point on the display plane; and wherein, when operated in the aligned state, a reference point in the dark region of the light feature is coincident with the reference point of the light sensor.

* * * * *